United States Patent [19]

Beckerman et al.

[11] 4,335,667
[45] Jun. 22, 1982

[54] PATTERN SELECTION ARRANGEMENT FOR A MULTIPLE PATTERN SEWING MACHINE

[75] Inventors: Howard L. Beckerman, Middleton, N.J.; Charles L. Mauro, New York, N.Y.

[73] Assignee: The Singer Company, Stamford, Conn.

[21] Appl. No.: 202,204

[22] Filed: Oct. 30, 1980

[51] Int. Cl.³ .................................................. D05B 3/02
[52] U.S. Cl. ............................ 112/158 E; 112/158 F
[58] Field of Search ........... 112/158 F, 158 E, 121.11, 112/121.12; 250/569

[56] References Cited

U.S. PATENT DOCUMENTS

| | | | |
|---|---|---|---|
| 3,600,592 | 8/1971 | Mahan | 250/569 |
| 4,181,086 | 1/1980 | Takenoya et al. | 112/158 E X |
| 4,236,467 | 12/1980 | Tanaka et al. | 112/158 F X |

Primary Examiner—Peter P. Nerbun
Attorney, Agent, or Firm—David L. Davis; Robert E. Smith; Edward L. Bell

[57] ABSTRACT

A multiple pattern sewing machine is provided with a first group of switches which are always visible and functional for selecting a pattern from a first group of stitch patterns which the sewing machine is capable of sewing. A second group of switches is concealed beneath a cover member. Also concealed by the cover member is a plurality of information bearing pivotally mounted plates. The machine contains circuitry for sensing which of the plates is exposed and dependent thereupon, the second group of switches may be actuated by an operator for selecting a pattern from a second group of patterns which the machine is capable of sewing.

6 Claims, 4 Drawing Figures

PATTERN SELECTION ARRANGEMENT FOR A MULTIPLE PATTERN SEWING MACHINE

DESCRIPTION

BACKGROUND OF THE INVENTION

This invention relates to sewing machines and, more particularly, to a pattern selection arrangement for an electronically controlled multiple pattern sewing machine.

Sewing machines employing sophisticated electronic technology for the storage and subsequent retrieval of stitch pattern information for a multiplicity of patterns have enjoyed great commercial success in recent years. With the advent of intergrated circuitry and single chip microcomputers, great savings in space have been achieved and the number of patterns which may be stored in the sewing machine's memory is virtually unlimited. One factor limiting the number of patterns which may be built into an electronically controlled multiple pattern sewing machine is the space required for the pattern display and selection arrangement. U.S. Pat. Nos. 3,913,506 and 4,177,744 disclose sewing machine pattern display and selection arrangements wherein all of the patterns which may be sewn by the sewing machine are at all times displayed to the operator. Unfortunately, an array of two dozen or more selectable patterns may tend to confuse an inexperienced operator. Also, it has been established that the vast majority of sewing time is spent sewing only a small number of basic stitch patterns such as straight stitch and zig zag.

It is therefore an object of the present invention to provide a pattern selection and display arrangement for an electronically controlled multiple pattern sewing machine which is easy to use without confusing the operator.

It is another object of this invention to provide such an arrangement wherein the most commonly utilized stitch patterns are most easily selectable.

SUMMARY OF THE INVENTION

The foregoing and additional objects are attained in accordance with the principles of this invention in a multiple pattern sewing machine having stitch forming instrumentalities positionally controlled over a predetermined range between stitches to produce a selected pattern of feed and bight controlled stitches from a plurality of different patterns, static memory means for storing pattern stitch information for the plurality of patterns, means operating in timed relation with the sewing machine for recovering selected pattern stitch information from the static memory means, and actuating means responsive to the pattern stitch information for influencing the stitch forming instrumentalities to produce a pattern of stitches corresponding to the selected pattern stitch information, by providing an operator influenced stitch pattern selection arrangement for selecting any one of the plurality of different patterns comprising first switch means for operator selection of a pattern from a first group of the plurality of different patterns, second switch means for selecting a pattern from a second group of the patterns consisting of the remaining ones of the plurality of different patterns, and means mounted on the sewing machine for selectively covering the second switch means from view and operation.

In accordance with an aspect of this invention, the second switch means includes a first plurality of switches, a second plurality of switches and a plurality of plates, the plates being pivotally mounted on a common axis so as to be selectively movable one by one in succession between a first substantially vertical position and a second substantially vertical position, only one at a time of the plates being visible in the first position, each of the plates including means for actuating a respective one of the first plurality of switches when each plate is in the first position, the second plurality of switches being arranged on the sewing machine adjacent an edge of the plates in the first position and adapted for operator actuation thereof, the sewing machine including means responsive to actuation of one of the second plurality of switches for selecting a pattern from the second group of patterns corresponding to a respective combination of one of the second plurality of switches and the visible one of the plates in the first position.

In accordance with another aspect of this invention, at least one of the plates carries informational graphics on a side visible when that plate is in the first position, the informational graphics being visually associated with the second plurality of switches and indicative of patterns selected in response to actuation of the second plurality of switches when that plate is visible in the first position.

In accordance with a further aspect of this invention, the selecting means in the sewing machine include means responsive to actuation of one or more of the first plurality of switches for determining which of the plates is visible in the first position.

In accordance with yet another aspect of this invention, the covering means includes a cover member pivotally mounted on the common axis with the plates and arranged to selectively expose for viewing and operation the second plurality of switches and the plates when in a first substantially vertical position and to conceal from view and operation the plates and the second plurality of switches when in a second substantially vertical position.

BRIEF DESCRIPTION OF THE DRAWINGS

The foregoing will be more readily apparent upon reading the following description in conjunction with the drawings wherein.

DETAILED DESCRIPTION

Figure 1:
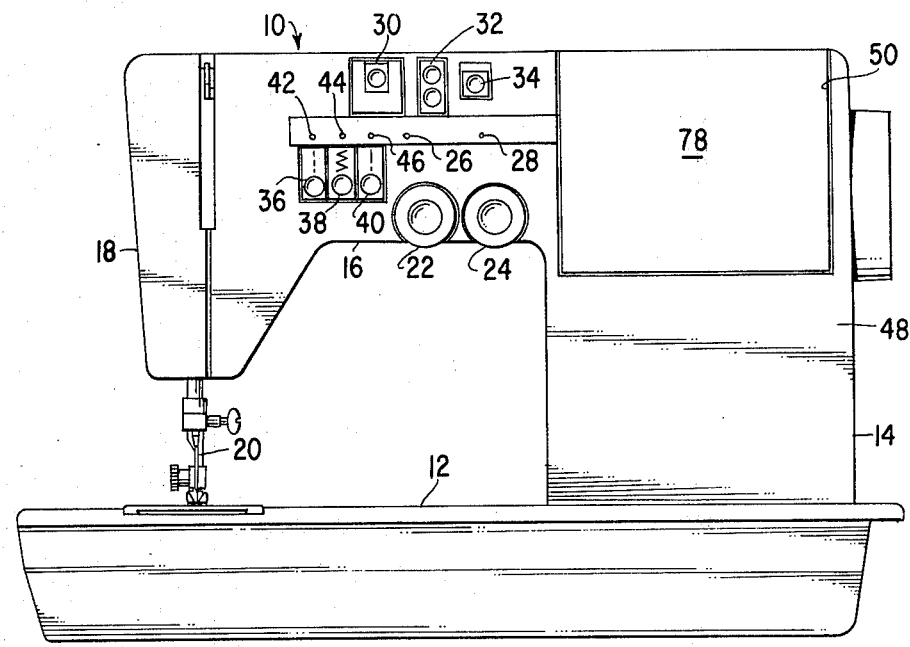
FIG. 1 is a front elevational view of a sewing machine including a pattern selection arrangement constructed in accordance with the principles of this invention.

Referring now to the drawings, wherein like elements in different figures thereof have the same reference character applied thereto, the sewing machine designated generally by the reference numeral 10 includes a work supporting bed 12, a standard 14, a bracket arm 16 and a sewing head 18. The sewing machine stitch forming instrumentalities include a needle 20 capable of being endwise reciprocated and laterally jogged to form zig zag stitches and a work feed dog (not shown) operating upwardly through slots formed in a throat plate on the bed 12 to transport the work across the bed 12 between needle penetrations. The pattern of stitches produced by operation of the sewing machine, i.e., the positional coordinates of each stitch penetration, may be influenced, for example, by data stored in a memory unit, as disclosed in U.S. Pat. No. 3,872,808, which is incorporated herein by reference.

Briefly, the subject matter of the above-referenced patent includes means for controlling the lateral jogging of the needle 20 and/or direction and magnitude of feed motion of the work feed dog in response to electronic stitch pattern data extracted from a solid state read only memory carried in the sewing machine frame in timed relation with the operation of the sewing machine. The referenced patent discloses an approach for selection of any specific one out of a plurality of different groups of stitch position coordinate pattern data stored in the memory, which approach is compatible with the present invention and which involves the choice of any particular pattern by selective identification of the address of the starting word of the pattern in the memory.

Operator controls for the sewing machine include a stitch length control 22 and a stitch width control 24 in the bracket arm 16. Additionally, a light emitting diode 26 is provided for indicating actuation of the stitch length control 22 and a light emitting diode 28 is provided for indicating actuation of the stitch width control 24. There is further provided on the bracket arm 16 a reverse sewing button 30, a needle position (up/down) selection switch 32 and a single/double needle selection switch 34.

In the operation of the sewing machine 10, the three patterns most commonly used are the straight stitch, the zig zag stitch and the basting stitch. To effect selection of this first group of patterns, there is provided a straight stitch selection button 36, a zig zag stitch selection button 38, and a basting stitch selection button 40, and associated with each and utilized for indicating the actuation thereof are respective light emitting diodes 42, 44 and 46. The remaining patterns capable of being sewn by the sewing machine 10 are selected by an arrangement mounted in the standard 14, as will be described in detail hereinafter. The construction details of the arrangement for selecting a pattern from the remaining group of patterns is fully described in copending U.S. Patent application Ser. No. 202,207, filed on even date herewith by Howard L. Beckerman and Allan M. Dob, and assigned to the assignee of the present invention. However, for the sake of completeness, a brief description of the arrangement will be given in sufficient detail for purposes of understanding the present invention.

Figure 3:
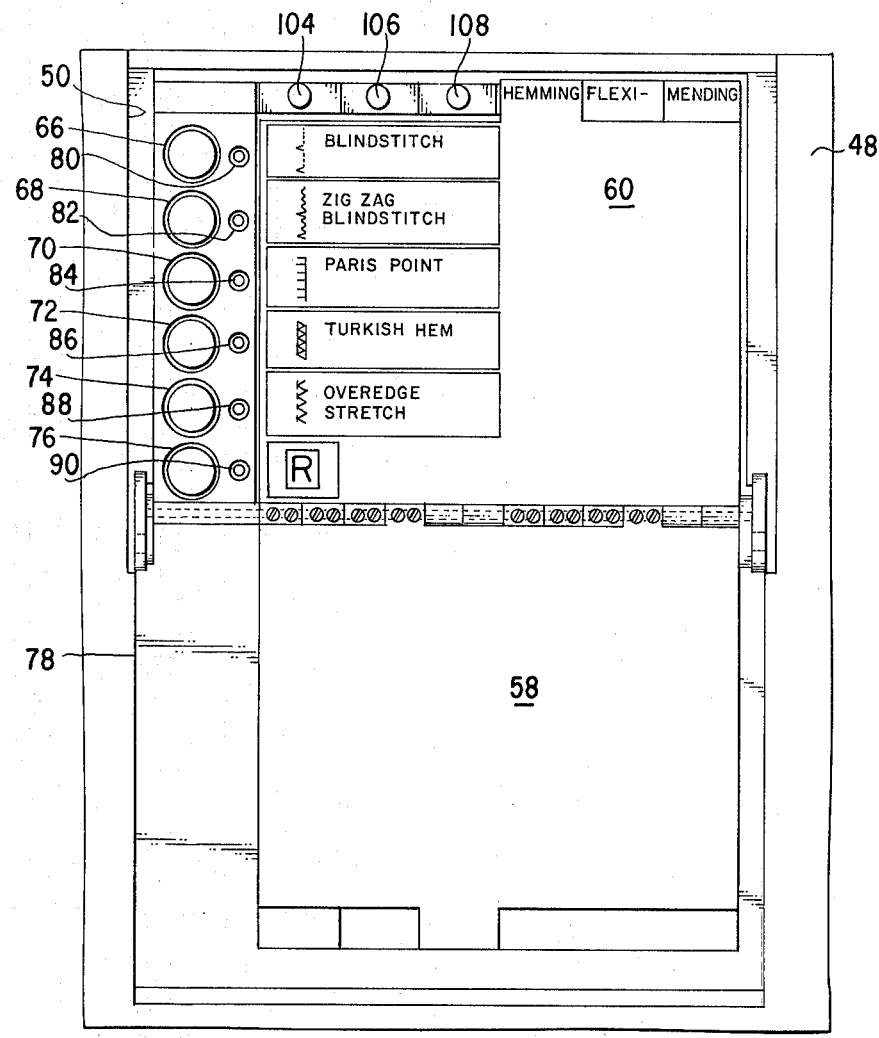
FIG. 3 is an enlarged front elevational view of a portion of the pattern selection arrangement according to this invention.

The standard 14 is formed with a flat front outer surface 48 and with a recess 50 in the upper front portion. The recess 50 is designed to hold pivoted information bearing plates 52, 54, 56, 58, 60 and 62, and a removable information bearing plate 64. Additionally, a group of operator actuatable switches 66, 68, 70, 72, 74 and 76 are mounted within the recess 50. A cover member 78 is provided for the plates and switches. The plates 52-62 are pivotally mounted on a common axis so as to be selectively movable one by one in succession between a first substantially vertical position and a second substantially vertical position. The cover member 78 is likewise pivotally mounted on the common axis with the plates and when it is in the first position, as shown in FIG. 1, all of the plates 52-64 and all of the switches 66-76 are concealed from view and operation. When the cover member 78 is in the second substantially vertical position, as shown in FIG. 3, the plates 52-64 and the switches 66-76 are visible and operable.

The plates 52-64 carry informational graphics visible to an operator when the plates are exposed to view. FIG. 3 illustrates some of the informational graphics which may be provided on one of the plates, for example, plate 60, which when visible, allows for operator selection of a hemming pattern, in a manner to be described hereinafter. In particular, the switches 66-76 are adjacent an edge of the plate 60 and when the plate 60 is exposed, the switch 66 may be actuated to select the blind stitch pattern, the switch 68 may be actuated to select the zig zag blind stitch pattern, the switch 70 may be actuated to select the paris point pattern, the switch 72 may be actuated to select the Turkish hem pattern and the switch 74 may be actuated to select the overedge stretch pattern. In addition, the switch 76 may be actuated to sew the selected pattern in reverse, i.e., the mirror image thereof. There is further provided a plurality of light emitting diodes (LED's) 80, 82, 84, 86, 88 and 90 each adjacent a respective one of the switches 66-76 and which is lit to indicate actuation of the respective switch. It may be seen from FIG. 3 that the informational graphics on the plate 60 is visually associated with the switches 66-76 and is indicative of the pattern selected in response to actuation of the respective one of these switches 66-76 when the plate 60 is visible in the first substantially vertical position.

In addition to the informational graphics indicative of pattern selection on the plates, the righthand side of the plate 60 and the reverse side of the plate 58, exposed when the plate 60 is in the first substantially vertical position and when the plate 58 is in the second substantially vertical position, may include instructional information assisting the operator in the selection of the proper accessories, such as the presser foot, and other information which may be required for sewing a selected pattern.

Figure 2:
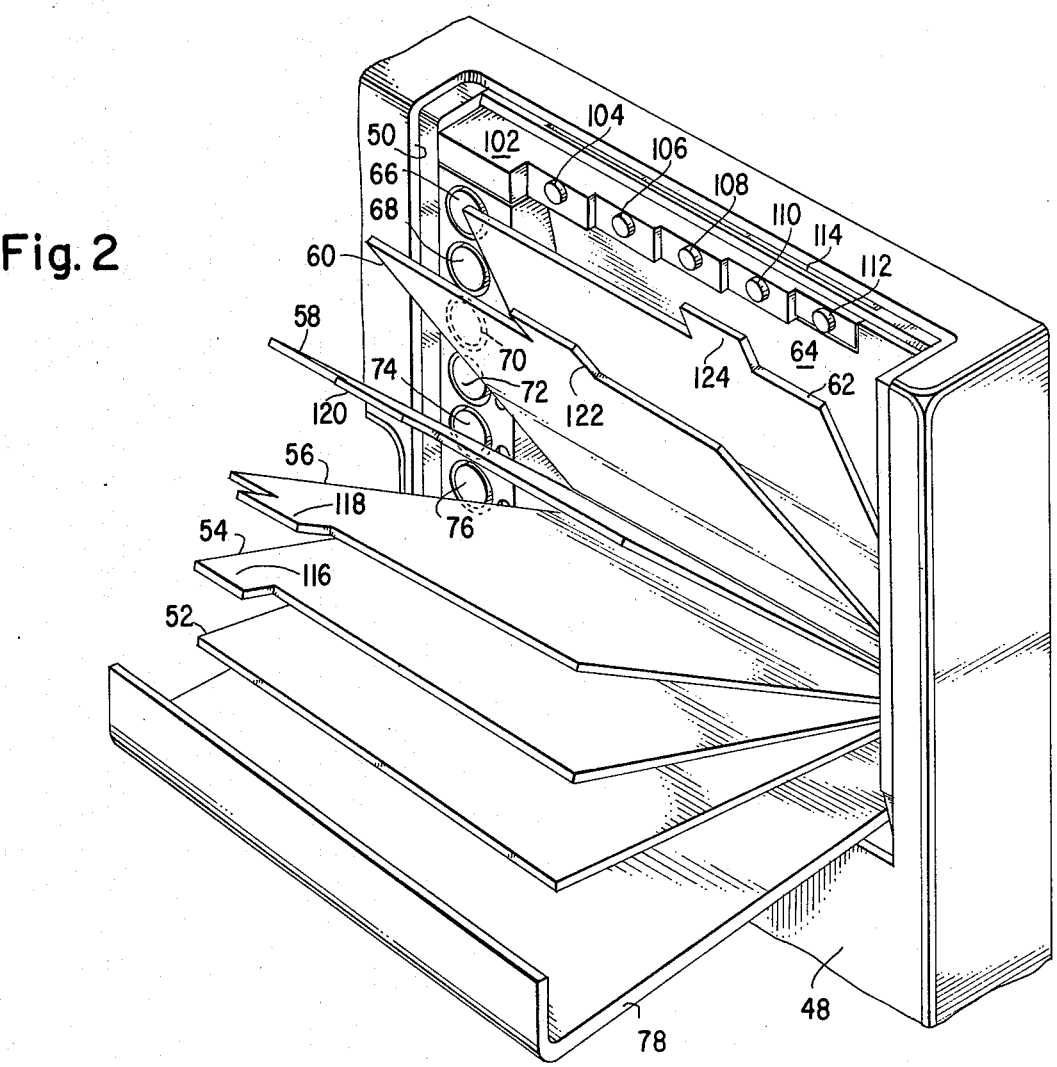
FIG. 2 is an enlarged perspective view showing a portion of the pattern selection arrangement of this invention.

The arrangement according to the present invention allows for a multiplexing of the switches 66-76, depending upon which of these plates 54-64 is exposed to view. In this regard, an arrangement is provided for determining which of the plates 54-64 is visible. Thus, as shown in FIG. 2, a stepped member 102 is provided with a plurality of pins 104, 106, 108, 110 and 112, the pins 104-112 being of conductive ferro-magnetic material. The plates 54-62 are likewise of conductive ferro-magnetic material, as disclosed in the aforereferenced copending patent application. A magnet 114 is provided in magnetic contact with the rear of the pin 104-112 so that as the tabs 116, 118, 120, 122 and 124 of the plates 54-66, respectively, come in contact with the pins 104-112, respectively, they are magnetically attracted and held in the first substantially vertical position. Each of the pins 104-112, in conjunction with the plates 54-62 acts as a capacitive switch by being electrically coupled to a respective capacitive switch circuit such as the type disclosed, for example, in U.S. Pat. No. 4,055,129.

Figure 4:
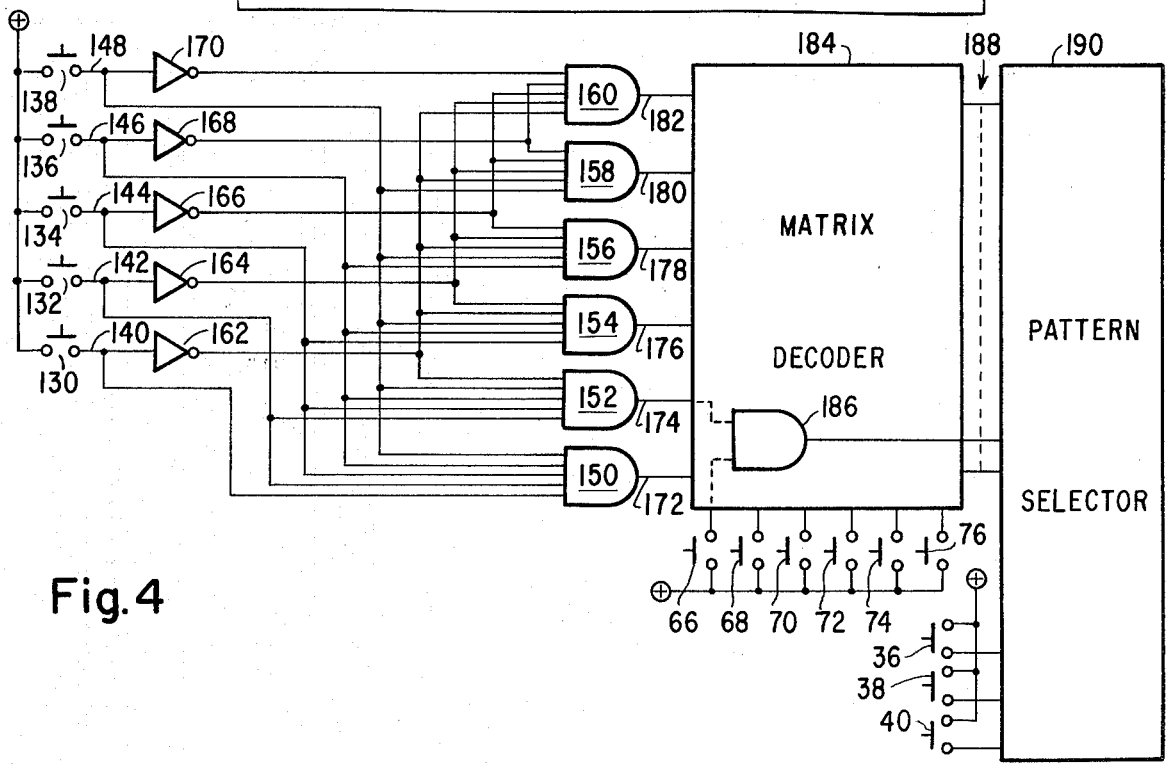
FIG. 4 is a schematic diagram of illustrative pattern selection circuitry constructed in accordance with the principles of this invention.

Referring now to FIG. 4, shown therein is a schematic circuit diagram of an illustrative pattern selection arrangement according to the present invention. Each of the capacitive switch circuits is schematically represented by a respective two terminal switch 130, 132, 134, 136 and 138 corresponding to the pins 104-112, respectively. Thus, when one of the tabs 116-124 is touching its respective pin 104-112, a voltage is applied to a respective lead 140, 142, 144, 146 and 148. The leads 140-148 are connected to an array of NAND gates 150, 152, 154, 156, 158, and 160 both directly and through an array of inverters 162, 164, 166, 168 and 170 so that there is a high signal on the lead 172 when all of the switches 130-138 are closed; there is a high signal on the lead 174 when the switches 132-138 are closed and the switch 130 is open; there is a high signal on the lead 176 when the switches 134-138 are closed and the switches 130 and 132 are open; there is a high signal on the lead 178 when the switches 136 and 138 are closed and the switches 130-134 are open; there is a high signal on the lead 180 when only the switch 138 is closed; and there is a high signal on the lead 182 when all of the switches 130-138 are open. Accordingly, the NAND gates 150-160 and the inverters 162-170 are responsive to the actuation conditions of the switches 130-138 for indicating which of the plates 54-64 is visible in the first substantially vertical position. Thus, a high signal on the lead 172 indicates that the plate 54 is visible in the first substantially vertical position; a high signal on the lead 174 indicates that the plate 56 is visible in the first substantially vertical position; a high signal on the lead 176 indicates that the plate 58 is visible in the first substantially vertical position; a high signal on the lead 178 indicates that the plate 60 is visible in the first substantially vertical position; a high signal on the lead 180 indicates that the plate 62 is visible in the first substantially vertical position; and a high signal on the lead 182 indicates that the plate 64 is visible in the first substantially vertical position. (The plate 52 illustratively is utilized for instructional purposes without corresponding to any group of patterns which may be selected. Plate 52 may be eliminated, or indeed may be supplemented by other plates.)

The leads 172-182, indicating which of the plates 54-64 is visible in the first substantially vertical position, are provided as inputs to matrix decoder 184. Additional input to the matrix decoder 184 are leads from the switches 66-76 which indicate which of the switches 66-76 is actuated by the operator. The matrix decoder 184 may include a matrix array of AND gates, such as the gate 186 which has as one input a lead corresponding to which of the plates 54-64 is visible in first substantially vertical position and as its other input a lead corresponding to one of the switches 66-76, as is well known in the art, so that the matrix decoder 184 has as its output a plurality of leads 188, each of which corresponds to a pattern selected by an operator, as is well known in the art. The leads 188 are connected to a pattern selector 190, as are leads from the pattern selection switches 36, 38 and 40. The pattern selector 190 corresponds to the pattern selector shown in FIG. 2 of the aforereferenced U.S. Pat. No. 3,872,808 and designated therein by the reference character 90. Thus, a pattern may be selected either by actuating one of the pattern selection switches 36-40 or by opening the cover 78, exposing an appropriate one of the plates 54-66 and actuating one of the switches 66-76.

Accordingly, there has been disclosed an improved pattern selection arrangement for a multiple pattern sewing machine. This arrangement provides for a very simple and uncluttered appearance for the sewing machine when the cover member 78 is closed, thereby giving the machine the appearance and function of a simple straight stitch, zig zag and basting stitch machine. However, when the cover member 78 is open to expose the flip plates and switches concealed thereby, the machine is seen to possess the capability for sewing a large number of patterns. It is additionally noted that at any time the operator may select one of the commonly utilized stitches by actuating one of the switches which is always visible and functionally active on the face of the sewing machine. It is understood that the above-described arrangement is merely illustrative of the application of the principles of this invention. Numerous other arrangements may be devised by those skilled in the art without departing from the spirit and scope of this invention, as defined by the appended claims.

I claim:

1. In a multiple pattern sewing machine having stitch forming instrumentalities positionally controlled over a predetermined range between stitches to produce a selected pattern of feed and bight controlled stitches from a plurality of different patterns, static memory means for storing pattern stitch information for said plurality of patterns, means operating in timed relation with said sewing machine for recovering selected pattern stitch information from said static memory means, and actuating means responsive to said pattern stitch information for influencing the stitch forming instrumentalities to produce a pattern of stitches corresponding to the selected pattern stitch information, an operator influenced stitch pattern selection arrangement for selecting any one of said plurality of different patterns comprising:

first switch means for operator selection of a pattern from a first group of said plurality of different patterns;

second switch means for selecting a pattern from a second group of said patterns consisting of the remaining ones of said plurality of different patterns, said second switch means including a first plurality of switches, a second plurality of switches and a plurality of plates, said plates being pivotally mounted on a common axis so as to be selectively movable one by one in succession between a first substantially vertical position and a second substantially vertical position, only one at a time of said plates being visible in said first position, each of said plates including means for actuating a respective one of said first plurality of switches when each said plate is in said first position, said second plurality of switches being arranged on said sewing machine adjacent an edge of the plates in the first position and adapted for operator actuation thereof, the sewing machine including means responsive to actuation of one of said second plurality of switches for selecting a pattern from said second group of patterns corresponding to the combination of the actuated one of said second plurality of switches and the visible one of said plates in said first position; and means mounted on said sewing machine for selectively covering said second switch means from view and operation.

2. The arrangement according to claim 1 wherein said covering means includes a cover member pivotally mounted on said common axis with said plates and arranged to selectively expose for viewing and operation said second plurality of switches and said plates when in a first substantially vertical position and to conceal from view and operation said plates and said second plurality of switches when in a second substantially vertical position.

3. The arrangement according to claim 1 wherein at least one of said plates carries informational graphics on a side visible when said at least one plate is in said first position, said informational graphics being visually associated with said second plurality of switches and indicative of the pattern selected in response to actuation of said second plurality of switches when said at least one plate is visible in said first position.

4. The arrangement according to claim 1 wherein said selecting means in said sewing machine includes means responsive to the actuation condition of said first plurality of switches for determining which of said plates is visible in said first position.

5. The arrangement according to claims 1 or 4 further including an additional plate mounted behind said pivotally mounted plates in said first substantially vertical position, said additional plate being arranged so as not to actuate any of said first plurality of switches.

6. The arrangement according to claim 1 further including means in proximate relation to said second plurality of switches for visually indicating which one of said second plurality of switches is actuated.

* * * * *